United States Patent [19]
Chinn

[11] 3,818,053
[45] June 18, 1974

[54] 6 α, 7 α-DIHYDRO-3'H-CYCLOPROPA [6,7]PREGNA-6-DIENNE-3,15,20-TRIONE AND CONGENERS

[76] Inventor: Leland J. Chinn, 6141 Elm St., Morton Grove, Ill. 61550

[22] Filed: Aug. 6, 1973

[21] Appl. No.: 385,662

[52] U.S. Cl............. 260/397.3, 260/397.4, 260/999
[51] Int. Cl.......................................... C07c 169/34

[56] References Cited
UNITED STATES PATENTS
3,123,622  3/1964  Tweit............................... 260/397.3
3,558,674  1/1971  Beard et al. ..................... 260/397.4

Primary Examiner—Henry A. French
Attorney, Agent, or Firm—John M. Brown

[57] ABSTRACT

Preparation of 6α, 7α-dihydro-3'H-cyclopropa [6,7]-pregna-4,6-diene-3,15,20-trione, the $\Delta^1$ analog, their diuretic activity, and intermediates are disclosed.

6 Claims, No Drawings

6α,7α-DIHYDRO-3'H-CYCLOPROPA[6,7]PREGNA-6-DIENNE-3,15,20-TRIONE AND CONGENERS

This invention relates to 6α,7α-dihydro-3'H-cyclopropa[6,7]pregna-4,6-diene-3,15,20-trione and congeners, and to processes for the preparation thereof. More particularly, this invention provides new, useful, and unobvious steroids of the formula

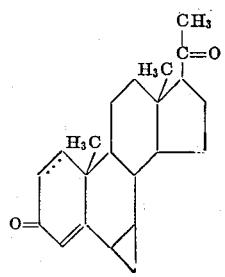

wherein the dotted line designates an optional double bond.

The enformulated compounds are useful by reason of their valuable biological properties. For example, they are diuretics adapted to reverse the effects of substances such as desoxycorticosterone acetate (DCA) on urinary sodium and potassium.

A standardized test for the foregoing diuretic property is described in U.S. Pat. No. 3,422,096. In a modification of this test using Charles River rats primed with 12 rather than 9 mcgm. of DCA but otherwise substantially identical, the products of Example 1E and 2C hereinafter both produced a significant response.

Those skilled in the art will recognize that observations of activity in standardized tests for particular biological effects are fundamental to the development of valuable new drugs, both veterinary and human.

Preparation of 6α,7α-dihydro-3'H-cyclopropa[6,7]-pregna-4,6-diene-3,15,20-trione and the Δ¹ analog proceeds by consecutively contacting 15α-acetoxypregna-4,6-diene-3,20-dione (U.S. Pat. No. 2,924,611) with lithium hydrotri-tert.-butoxyaluminate in tetrahydrofuran and dichlorodicyanobenzo-quinone (DDQ) in benzene. The resultant 15α-acetoxy-20ε-hydroxypregna-4,6-dien-3-one is contacted with dimethyloxosulfonium methylide in dimethyl sulfoxide to produce 15α-acetoxy-6α7α-dihydro-20ε-hydroxy-3'H-cyclopropa[6,7]pregna-4,6-dien-3-one, wherein the 20-hydroxyl is oxidized to carbonyl by contacting in acetone with Jones reagent (a mixture of chromium trioxide, sulfuric acid, and water). From the 15α-acetoxy-6α,7α-dihydro-3'H-cyclopropa[6,7]-pregna-4,6-diene-3,20-dione thus obtained, on heating in benzene at the boiling point with DDQ, the Δ¹ analog eventuates. The acetoxyl in the latter two steriods is hydrolyzed by contacting with sodium carbonate in aqueous methanol, and acetonic Jones reagent serves to convert the resultant 15-hydroxyl to carbonyl, affording the products enformulated above.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. 15α-Acetoxy-20ε-hydroxypregna-4,6-dien-3-one.

A mixture of 138 parts of 15α-acetoxypregna-4,6-diene-3,20-dione, 135 parts of lithium hydrotri-tert.-butoxyaluminate, and 1,125 parts of tetrahydrofuran is maintained at around 5° for 2 hours, then poured into 20,000 parts of ice water. The resultant mixture is made slightly acid with 5 percent hydro-chloric acid, and the mixture thus obtained is extracted with 36,000 parts of benzene. The benzene extract is washed with water, dried over anhydrous sodium sulfate, and thereupon concentrated to one-half volume by distillation at atmospheric pressure. To the distilland is added 30 parts of dichlorodicyanobenzoquinone. The resultant mixture is heated at the boiling point under reflux for 2 hours, then cooled, washed successively with aqueous 3 percent sodium hydroxide and water, dried over anhydrous sodium sulfate, and stripped of solvent by vacuum distillation. The residue is 15α-acetoxy-20ε-hydroxypregna-4,6-diene-3-one.

B. 15α-Acetoxy-6α,7α-dihydro-20ε-hydroxy-3'H-cyclopropa[6,7]pregna-4,6-dien-3-one.

A mixture of 6,120 parts of 15α-acetoxy-20ε-hydroxypregna-4,6-dien-3-one with a solution of five parts of dimethyloxosulfonium methylide in approximately 70,000 parts of dimethyl sulfoxide is allowed to stand at room temperatures for 28 hours, whereupon it is diluted with 400,000 parts of water. The resultant mixture is acidified with 18 percent hydrochloric acid, and the mixture thus obtained is extracted with ethyl acetate. The ethyl acetate extract is washed with water, dried over anhydrous sodium sulfate, and stripped of solvent by vacuum distillation. The residue is taken up in benzene; and the benzene solution is chromatographed on neutral alumina, using benzene and mixtures thereof with increasing amounts of ethyl acetate as developing solvents. From an eluate comprising 5 percent ethyl acetate in benzene, on evaporation of the solvent, 15α-acetoxy-6α,7α-dihydro-20ε-hydroxy-3'H-cyclopropa[6,7]pregna-4,6-dien-3-one melting at 246°-248° is obtained as the residue.

C. 15α-Acetoxy-6α,7α-dihydro-3'H-cyclopropa[6,7]-pregna-4,6-diene-3,20-dione.

To a solution of 99 parts of 15α-acetoxy-6α,7α-dihydro-20ε-hydroxy-3'H-cyclopropa[6,7]-pregna-4,6-dien-3-one in 400 parts of acetone is added 128 parts of Jones reagent (a mixture prepared by dissolving 100 parts of chromium trioxide in 200 parts of water and consecutively adding 150 parts of concentrated sulfuric acid and 200 parts of water). The reaction mixture is allowed to stand at room temperatures for 3 hours, whereupon it is diluted with 50,000 parts of water. The resultant mixture is extracted with ethyl acetate. The ethyl acetate extract is washed with water, dried over anhydrous sodium sulfate, and stripped of solvent by vacuum distillation. The residue is washed by trituration with ether and crystallized from ethyl acetate to give 15α-acetoxy-6α,7α-dihydro-3'H-cyclopropa[6,7]pregna-4,6-diene-3,20-dione melting at 230°-233°.

D. 6α,7α-Dihydro-15α-hydroxy-3'H-cyclopropa[6,7]-pregna-4,6-diene-3,20-dione.

A mixture of 227 parts of 15α-acetoxy-6α,7α-dihydro-3'H-cyclopropa[6,7]pregna-4,6-diene-3,20- dione, 200 parts of sodium carbonate, 4,000 parts of water, and 17,600 parts of methyl alcohol is stirred at room temperatures for 6 hours. The methyl alcohol is then distilled off, and the distilland is diluted with 20,000 parts of water. The resultant mixture is extracted with dichloromethane. The dichloromethane extract is dried over anhydrous magnesium sulfate and stripped of solvent by vacuum distillation. The residue, upon crystallization from a mixture of ethyl acetate and ether, affords 6α,7α-dihydro-15α-hydroxy-3'H-cyclopropa[6,7]-pregna-4,6-diene-3,20-dione which melts at 110°–112°, resolidifies, and remelts at 133°–135°.

E. 6α,7α-Dihydro-3'H-cyclopropa[6,7]-4,6-diene-3,15,20-trione.

To a solution of 18 parts of 6α,7α-dihydro-15α-hydroxy-3'H-cyclopropa[6,7]-4,6-diene-3,20-dione in 3,200 parts of acetone maintained at around 5 percent is added approximately 30 parts of Jones reagent (prepared as described in Example 1C). The resultant mixture is allowed to stand at around 5° for one-half hour, whereupon it is diluted with 5 volumes of water. Acetone is removed by vacuum distillation; and insoluble solids are filtered from the distilland, washed with water, dried in air and crystallized from ethyl acetate to give 6α,7α-dihydro-3'H-cyclopropa[6,7]pregna-4,6-diene-3,15,20-trione melting at 180°–182°.

EXAMPLE 2

A. 15α-Acetoxy-6α,7α-dihydro-3'H-cyclopropa[6,7]-pregna-1,4,6-triene-3,20-dione.

A mixture of 50 parts of 15α-acetoxy-6α,7α-dihydro-3'H-cyclopropa[6,7]-pregna-4,6-diene-3,20-dione, 37 parts of dichlorodicyanobenzoquinone and 5,400 parts of anhydrous benzene is heated at the boiling point under reflux in a nitrogen atmosphere for 20 hours. The reaction mixture is then chilled and thereupon diluted with three volumes of ether. The mixture thus obtained is washed successively with aqueous 2 percent sodium hydroxide and water, dried over anhydrous magnesium sulfate, and stripped of solvent by vacuum distillation. The residue, crystallized from ethyl acetate, is 15α-acetoxy-6α,7α-dihydro-3'H-cyclopropa[6,7]pregna-1,4,6-triene-3,20-dione melting at 231°–233°.

B. 6α,7α-Dihydro-15α-hydroxy-3'H-cyclopropa[6,7]-pregna-1,4,6-triene-3,20-dione.

A mixture of 2 parts of 15α-acetoxy-6α,7α-dihydro-3'H-cyclopropa[6,7]pregna-1,4,6-triene-3,20-dione, 2 parts of sodium carbonate, 20 parts of water, and 200 parts of methyl alcohol is stirred at room temperatures for 15 hours. The methyl alcohol is then removed by vacuum distillation, and the residue is diluted with 100 parts of water. The mixture thus obtained is extracted with dichloromethane. The dichloromethane extract is washed with water, dried over anhydrous magnesium sulfate, and stripped of solvent by vacuum distillation. The residue is crystallized from ethyl acetate to give 6-α,7α-dihydro-15α-hydroxy-3'H-cyclopropa-[6,7]pregna-1,4,6-triene-3,20-dione melting at 246°–248°.

C. 6α,7α-Dihydro-3'H-cyclopropa[6,7]pregna-1,4,6-triene-3,15,20-trione.

To a stirred solution of 20 parts of 6α,7α-dihydro-15α-hydroxy-3'H-cyclopropa[6,7]-pregna-1,4,6-triene-3,20-dione in 1,600 parts of acetone at 0°–5° is added approximately 31 parts of Jones reagent (prepared as described in Example 1C). The reaction mixture is maintained with stirring at 5°–10° for one-half hour, then stirred for an additional one-half hour at room temperatures. Approximately 16 parts of isopropyl alcohol is introduced, followed by 5 volumes of water. Acetone is removed from the resultant mixture by vacuum distillation. The insoluble solids present in the distilland are then filtered out, washed with water, dried in air, and recrystallized from a mixture of dichloromethane and ethyl acetate to give 6α,7α-dihydro-3'H-cyclopropa[6,7]pregna-1,4,6-triene-3,15,20-trione melting at 213°–215°.

What is claimed is:

1. A compound of the formula

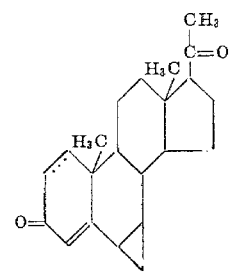

wherein the dotted line designates a optional double bond.

2. A compound according to claim 1 which is 6α,7α-dihydro-3'H-cyclopropa[6,7]pregna-4,6-diene-3,15,20-trione.

3. A compound according to claim 1 which is 6α,7α-dihydro-3'H-cyclopropa[6,7]pregna-1,4,6-triene-3,15,20-trione.

4. A compound of the formula

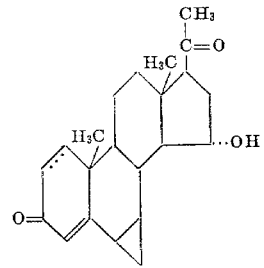

wherein the endocyclic dotted line designates an optional double bond.

5. A compound of the formula

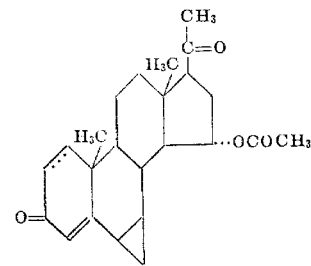

wherein the endocyclic dotted line designates an optional double bond.

6. 15α-Acetoxy-6α,7α-dihydro-20ε-hydroxy-3'H-cyclopropa[6,7]pregna-4,6-diene-3-one.

* * * * *

UNITED STATES PATENT OFFICE
CERTIFICATE OF CORRECTION

Patent No. 3,818,053   Dated June 18, 1974

Inventor(s) Leland J. Chinn

It is certified that error appears in the above-identified patent and that said Letters Patent are hereby corrected as shown below:

Title, "Dienne" should be --Diene--.
Col. 1, in the formula,

" 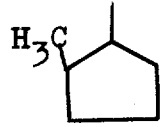 "   should be -- 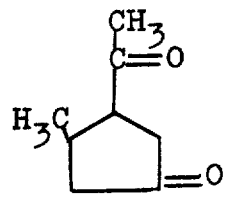 --

Col. 1, line 47, "6α7α" should be --6α,7α--.
Col. 3, line 14, "[6,7]-4,6" should be --[6,7]pregna-4,6--.
Col. 3, line 17, "[6,7]-4,6" should be --[6,7]pregna-4,6--.
Col. 4, in the Claim 1 formula, " 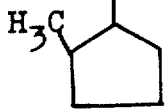 "   should be -- 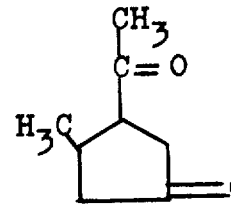 --

Signed and sealed this 8th day of October 1974.

(SEAL)
Attest:

McCOY M. GIBSON JR.
Attesting Officer

C. MARSHALL DANN
Commissioner of Patents